Patented Aug. 11, 1953

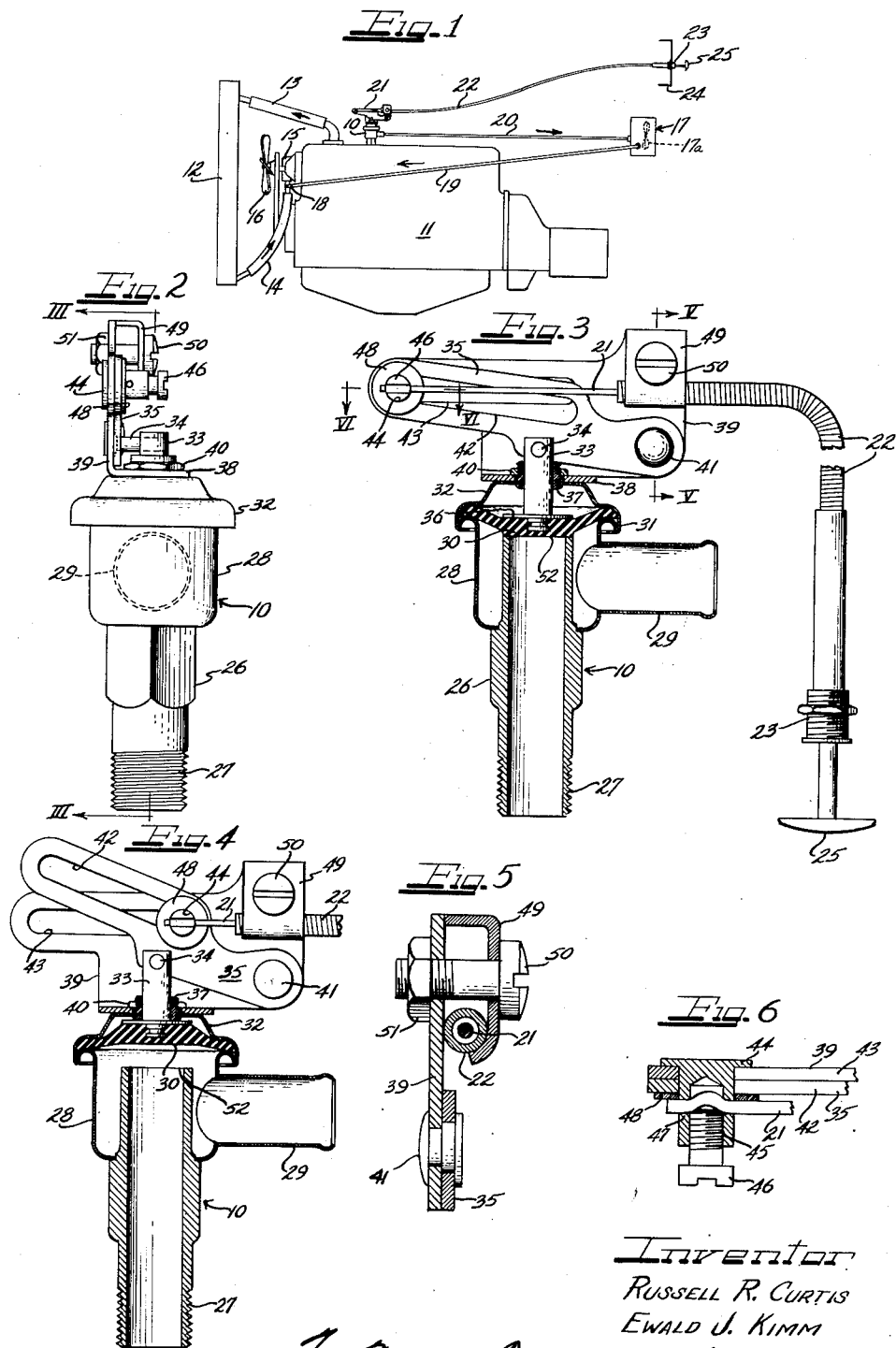

2,648,351

UNITED STATES PATENT OFFICE 2,648,351

VARIABLE-SPEED REMOTE CONTROL FOR VALVES

Russell R. Curtis, Bedford, Ind., and Ewald J. Kimm, Dayton, Ohio, assignors to Curtis Automotive Devices, Inc., Bedford, Ind., a corporation of Ohio Application April 14, 1949, Serial No. 87,534

9 Claims. (Cl. 137—750)

This invention deals with a remote control valve construction and more particularly with a remote control valve adapted to control the flow of hot water through an automobile hot water heater and thereby regulate the amount of heat input to the air discharged through the heater.

Prior to our invention, the conventional hot water car heater was provided with variable speed motor to control the heat output from the heater and a conventional shut-off valve was provided in the system to which the hose was attached for the heating connection so that during the time when the car heater was not in use the valve was shut-off preventing flow of fluid to the car heater and during the heating season the shut-off valve was opened to be closed again only during mild weather. With this type of control valve and variable speed motor fan it was not possible to provide the range of heating desired by the operator from the dashboard of the automobile.

Accordingly, the invention relates to a remote control valve for an automobile hot water controlled by Bowden cable movement from the dashboard of the automobile so that the valve gives a flow proportionate to the cable movement. More specifically, this invention relates to a remote control valve in which there are no moving metal parts in contact with the flow of liquid in the cooling system and mechanism for actuating the valve is a simple lever construction which will not flex the cable and which correlates the degree of value opening with the extent cable pulled in such a manner as to produce a constantly increasing flow.

A feature of this invention is that of irreversibility since the internal pressure in the cooling system will not cause the valve to change in setting.

Another feature of the invention is that the entire lever and bracket assembly for the remote control valve may be rotated to any position required on various installations without disturbing the diaphragm by merely loosening the nut clamping the bracket to the cap overlying the diaphragm.

It is a principal object of our invention to provide a cable actuated valve for an automobile hot water heater system which gives a flow proportionate to cable movement, which is simple, consistent in performance, and which may be produced at low cost.

Another important object is to provide a Bowden wire actuated slide for swinging a remotely pivoted lever having a track for the slide and effecting reciprocation of a member pivoted thereon.

Another object of the invention is to provide a remote control valve for an automobile hot water system with an absolutely tight seal in its closed position to prevent any flow at all through the heater in warm weather.

Another object of the invention is to provide a remote control valve for a hot water heater system which is not affected by engine vibration.

Still another object of the invention is to provide a remote control valve construction assembled from prefabricated parts in which every part is a high production part which can be made in mass production at low cost.

Another object of the invention is to provide a remote control valve which is of relatively small size for the large capacity thereof.

The novel features which we believe to be characteristic of our invention are set forth with particularity in the appended claims. Our invention, itself, however, both as to its organization and method of operation, together with further objects and advantages, may thus be understood by reference to the following description taken in connection with the accompanying drawings.

Figure 1 is a view in elevation of an automobile cooling system, together with an automobile hot water heater connected to the cooling system of the automobile including the remote control valve and the control therefor of our invention applied thereto;

Figure 2 is a front elevational view of the remote controlled valve;

Figure 3 is a vertical sectional view taken along the line III—III of Figure 2, illustrating the diaphragm of the valve and the control therefor;

Figure 4 is a vertical sectional view similar to Figure 3 illustrating the diaphragm and the actuating mechanism therefor in the open position of the valve;

Figure 5 is a vertical sectional view taken along line V—V of Figure 3 illustrating the clamp for the Bowden cable and the lever pivot connection; and, Figure 6 is a sectional view taken along line VI—VI of Figure 3 illustrating the Bowden cable connection between the lever for actuating the diaphragm and the lever bracket.

Referring to the drawings, the arrangement of an automobile cooling system including an automobile hot water car heater utilizing the remote control valve 10 is illustrated schematically in Figure 1. The valve 10 is connected to the cylinder head of the engine block 11 and the cooling system of the engine includes the conventional radiator 12 connected to the engine block through a discharge hose 13 and inlet hose 14 connected to a suitable pump 15 which discharges cooling fluid to the engine block and cylinder head. The pump 15 and a fan 16 are both driven from the engine.

A suitable hot water heater 17 provided with a conventional motor driven fan 17a for circulating air through the interior of the automobile, is connected to a suitable outlet connection 18 on the inlet side of pump 15 by piping or tubing 19. Piping or tubing 20 connects the heater 17 with the control valve 10 suitably connected to the head of the engine.

A Bowden cable 21 and housing or sheath 22 of conventional construction are provided with securing means 23 to hold the housing 22 to an automobile dash 24. A push-pull handle 25 is attached to the wire or cable 21 for actuating the valve operating mechanism which will be described later in greater detail.

Referring to Figures 2 to 6, inclusive, the body of the valve 10 is a silver or copper brazed assembly of a simple turned tubular bar 26 threaded at 27 for securing the valve to the engine head, a drawn cup 28, and a tube nipple 29. A synthetic rubber diaphragm 30 is pressed between outturned lip 31 of the cup 28 and the periphery of a stamped cap 32 which acts as both the valve head and a diaphragm clamp and seal.

A stem 33 is snapped into a mating blind opening complementally formed to the end of the stem at the center of the diaphragm and raises and lowers the diaphragm by means of a pin 34 pivoted to a lever 35. The thickened center portion of the diaphragm 30 is backed up by a washer 36 resting against a shoulder of the stem 33.

The cap 32 has riveted to it a threaded bushing 37 over which a flange 38 of a bracket 39 fits and is securely tightened by a clamping nut 40.

The lever 35 is freely pivoted to the bracket 39 by a specially formed rivet construction 41, Figure 5, provided with a shoulder abutting against the lever bracket 39 which suitably journals the lever for pivotal movement thereon. The lever 35 and bracket 39 have slots 42 and 43, respectively, in which a special pin 44, Figure 6, freely slides.

The pin 44 has a blind threaded hole 45, Figure 6, into which a locking screw 46 is assembled, and a small cross hole 47 through which the Bowden wire 21 passes, enabling the wire to be tightly clamped after proper positioning. A washer 48 fitted on the pin 44 between the lever 35 and the Bowden cable 21, Figure 6, prevents the pin from slipping back through the slots 42 and 43.

The Bowden housing 22 is clamped to the bracket 39 by means of a clamping member 49, screw 50 and nut 51, Figure 5.

With the novel control mechanism disclosed for actuating the diaphragm 30, it is evident when the Bowden control cable 21 is actuated through the push-pull handle 25, that the pin 44 (Figures 3, 4 and 6) is caused to slide back and forth within the slots 42 and 43 moving the lever 35 between the position shown in Figure 3 in which the valve diaphragm 30 seats on the valve seat end 52 of the bar and closes the valve, and the position shown in Figure 4, in which the valve diaphragm 30 is raised off of the seat 52 opening the valve.

The arrangement of the slots 42 and 43 and the lever fulcrum point 41 is such as to give a most desirable action in controlling the flow of liquid.

Thus, as the Bowden control 25 is pulled out to open the closed valve the movement of the diaphragm 30 is very slight at the start relative to the movement of the control but increases as the opening control movement continues. This produces a very fine control at low rates of flow, where such control is necessary, coupled with attainment of maximum opening on short strokes. The valve when closed will receive only slight opening movement by relatively long cable travel because the cable action is then at the end of the lever 35 (Figure 3). However, as a valve is cracked or moved off of its seat the flow increases at a rapid rate. This rate decreases as the already opened valve moves to a more removed position from its seat. In the present arrangement, the cable pin 44 moves toward the lever fulcrum to shorten the effective lever length and a short cable pull causes greater lever and valve movement. A direct relationship of flow and linear movement of the cable can be provided by curving the slot 42 in the lever 35. It is also obvious that the shape of the slot in the lever may be changed to provide any desired relationship between motion of the cable and rise of the valve.

It should also be noted that straight line motion is provided for the movement of the cable 21 as the lever 35 is actuated. This construction prevents bending of the extended end of the cable and in the actuation of the cable direct pull and push is provided with no kinking of the cable. This construction permits simple secure clamping of the Bowden housing. This construction also permits rotation of the bracket 39 around the axis of the stem 33 to permit the best possible location of the Bowden wire housing to prevent kinking of the wire 21 during operation thereof.

Referring to Figures 3 and 4, as the control cable 21 is moved from the open position, Figure 4, to the closed position, Figure 3, the mechanical advantage of the lever rapidly increases and is at maximum in the fully closed position, Figure 3, enabling the diaphragm 30 to be squeezed tightly against the seat 52 without imposing such force on the cable as to cause it to pull out and become inoperative.

It is therefore evident that this invention provides a remote control valve composed of simple high production parts assembled by a high production method such as a brazing operation for assembling certain of the parts in unitary fluid type construction.

Since no moving metal part is ever in contact with the liquid the cheapest metals can be used. Thus all parts can be steel, preferably cadmium plated. The diaphragm and outlet cup around the valve seat produce high flow capacity for minimum overall valve size. The diaphragm actuating linkage is effectively held in set position by the mere friction in the Bowden cable assembly and the valve will hold any position to which it is adjusted.

While we have shown a particular embodiment of our invention, it will, of course, be understood that we do not wish to be limited thereto since many modifications of most of the elements employed and their cooperative structures may be made without departing from the spirit and scope thereof. We, of course, contemplate by the appended claims to cover any such modifications as fall within the true spirit and scope of our invention.

We claim as our invention:

1. In a valve assembly including a valve body having an open ended passageway with a valve seat on one end thereof, a cup on said body surrounding said one end of the passageway and adapted to receive fluid therefrom, a diphragm spanning the open end of the cup, an apertured cover on the cup clamping the periphery of the diaphragm to the cup, a stem slidable through the aperture of the cover, said diaphragm having an opening therein anchoring said stem, said stem being adapted to rotate relative to said diaphragm, a bracket having an apertured first leg bottomed on said cover and receiving the stem therethrough, said bracket having a second leg extending upwardly from the first leg, said second leg having an elongated slot at an angle to the axis of the stem, a slotted lever pivoted on said second leg at a point remote from said stem, said slots being arranged at an angle to each other, a slide riding in both slots, a Bowden wire housing clamp on said second leg arranged to hold the end portion of a Bowden wire housing to direct the Bowden wire from the housing straight along the axis of the bracket slot, a Bowden wire clamp on said slide, a pin extending laterally from said stem toward said upstanding second leg of the bracket and pivotally anchoring said stem to the lever in spaced relation from the lever pivot, and a nut releasably clamping the bracket to the cover whereby the bracket can be selectively rotated around the axis of the stem while the stem rotates relative to the diaphragm to prevent torsion load on the diaphragm, and said slide being effective to swing the lever about its pivot for reciprocating the stem to move the diaphragm toward and away from said valve seat.

2. A diaphragm valve comprising a valve body having an open ended passageway with a valve seat on one end thereof, a cup around said one end of the passageway adapted to receive fluid therefrom, a diaphragm spanning the open end of the cup, an apertured cover on the cup clamping the periphery of the diaphragm to the cup, a stem anchored to said diaphragm and projecting through the cover, an L-shaped bracket having a first apertured leg mounted on said cover and slidably receiving the stem therethrough together with a second upstanding leg having a slot at an angle to the axis of said stem, a slotted lever connected to the stem and pivoted on said second leg at a point remote from the stem, said slots being arranged at an angle to each other, a slide riding in both of said slots, a Bowden wire sheath clamp on said second leg positioned to direct a Bowden wire from the end of the sheath straight along the axis of the slot in said bracket, means on said slide for anchoring the end portion of a Bowden wire therein, and said slide being propelled by a Bowden wire anchored therein to travel along the length of the slots in the bracket and lever for swinging the lever about its pivot to reciprocate the stem and positively flex the diaphragm onto and off said seat for opening and closing the valve.

3. A diaphragm valve comprising a valve body having a flow passage, a diaphragm controlling flow through said passage, a stem slidable relative to said body for flexing the diaphragm to open and close the valve, an angle bracket having a first leg adapted to receive the stem therethrough in slidable relation together with a second leg extending upwardly from said first leg, said second leg having a slot at an angle to the axis of the stem, a lever pivoted on said second leg having an elongated slot adapted to register with the bracket slot in an angular relation therewith, a slide riding in both of said slots, a Bowden wire sheath clamp on said second leg adapted to anchor the end portion of a Bowden wire sheath for directing the Bowden wire therefrom straight along the axis of the bracket slot, means on said slide for anchoring the end portion of a Bowden wire projecting from a sheath anchored on said bracket, means pivotally connecting the stem and lever in spaced relation from the lever pivot on said second leg, and said slide when propelled by a Bowden wire along the axis of said slots being effective to swing the lever about its pivot for reciprocating the stem to flex the diaphragm for opening and closing the valve.

4. A diaphragm valve comprising a valve body having a flow passage, a diaphragm controlling flow through said passage, a stem projecting from the body and anchored to the diaphragm in the body, a support member on the valve body receiving the stem therethrough, said support member having an upstanding portion with a slot therein at an angle to the axis of the stem, a slotted lever pivoted on said upstanding portion at a point remote from said stem, said slots being arranged at an angle to each other, a pin connecting said stem with said lever in spaced relation from said pivot, and a slide riding in both of said slots and movable to swing the lever about its pivot for reciprocating the stem.

5. A remote control valve assembly comprising a valve body, a valve in the body controlling flow therethrough, a valve stem projecting from the body and arranged to open and close the valve by reciprocal movement thereof, an L-shaped bracket having a first apertured leg mounted on the valve body and receiving the stem in slidable relation therethrough together with a second upstanding slotted leg having an elongated slot at an angle to the axis of the stem, a slotted lever pivoted on said second leg in spaced relation from said stem, said slots being arranged at an angle to each other, means connecting said stem with said lever in spaced relation from the pivot, a clamp member adapted to overlie a portion of said second leg and having a flange on one end thereof adapted to be bottomed on said second leg together with a rounded portion on the other end thereof adapted to overlie a Bowden wire sheath, a bolt extending through said clamp member and second leg, a nut on said bolt adapted to swing the member about said flange for clamping the rounded end thereof against a Bowden wire sheath, a slide riding in both of said slots for swinging the lever about its pivot to reciprocate said stem, said slide having an internally threaded shank projecting through the lever slot, a washer on said shank overlying the lever, said shank having a transverse hole therethrough beyond said washer adapted to receive a Bowden wire therethrough, and a screw threaded into said shank for deflecting the wire therein to clamp the wire to the slide and thereby hold the washer between the wire and lever, whereby said slide will cooperate with the said clamp to maintain the Bowden wire in a straight line free from kinking as it moves the slide along the axis of the slot in the bracket to swing the lever and operate the valve.

6. A valve adapted to meter flow in accurate relation to the amount of movement of a Bowden wire and adapted to maintain its adjusted position irrespective of pressure variations on fluid therein and vibration thereof which comprises a valve body having a flow passageway therethrough and a valve seat at one end thereof, a cup member surrounding said one end of the body and adapted to receive fluid from the body, a discharge nipple projecting from said cup, a flexible diaphragm spanning said cup and adapted to move toward and away from said seat for controlling flow from the body into the cup, an apertured cover for said cup clamping the periphery of the diaphragm to the mouth of the cup, a bushing on said cover, a stem freely slidable through said bushing and anchored to said diaphragm for flexing the diaphragm onto and off its seat, an angle bracket having a first leg on said cover and receiving said bushing therethrough, a nut threaded on said bushing for mounting the angle bracket on the cover, said angle bracket having an upstanding second leg with an elongated slot therein, a slotted lever fulcrumed on said second leg in spaced lateral relation from said stem, said slots being arranged at an angle to each other, a pin connecting said stem with an intermediate portion of said lever, said slot in said lever and said slot in said second leg of the bracket extending beyond said pin connection between the stem and lever, a slide riding in both of said slots, a Bowden wire assembly including a sheath and a wire projecting from said sheath, a clamp on said second leg for anchoring the end portion of the Bowden wire sheath to direct the wire therefrom along the length of the slot in the second leg of the bracket, means on said slide anchoring said wire, and said wire being slidable through said sheath for moving the slide along the length of the slots to swing the lever about its fulcrum and reciprocate the stem in the bushing for flexing the diaphragm to open and close the valve, the movement of the slide away from the lever fulcrum being effective to increase the mechanical advantage of the lever on the stem for causing the stem to squeeze the diaphragm tightly against its seat without unduly loading the Bowden wire.

7. A valve assembly comprising a valve body having a flow passageway therethrough and a valve seat therein, a valve coacting with said seat to control flow through the body, a valve stem anchored to said valve and projecting from said body in slidable relation therewith, means on said valve body having an elongated slot therein at an angle to the axis of said stem, a slotted lever fulcrumed on said means in spaced relation from said stem, said slots of the lever and means on the valve body being disposed at an angle to each other, means pivotally connecting said stem and said lever in spaced relation from said fulcrum, the slots of said lever and said means extending away from the fulcrum on both sides of the pivot connection between the stem and lever, a slide riding in both of said slots and effective to swing the lever about its fulcrum for reciprocating the stem to move the valve relative to its seat, and said lever being effective to increase the mechanical advantage on the valve in a valve closing direction as the slide moves on one side of the pivot away from the lever fulcrum and to increase the rate of movement of the valve in a valve-opening direction as the slide moves toward the fulcrum on the other side of the pivot.

8. A diaphragm valve comprising a valve body having a flow passage, a diaphragm controlling flow through said passage, a stem projecting from the body and anchored to the diaphragm in the body, a support member on the valve body receiving the stem therethrough, said support member having an upstanding portion with a slot therein at an angle to the axis of the stem, a slotted lever pivoted on said upstanding portion at a point remote from said stem, said slots being arranged at an angle to each other, an actuating pin lying in a plane perpendicular to the planes of said lever and said upstanding portion and passing through said slots, and pin means connecting said stem with said lever in spaced relation from said pivot, whereby actuation of said actuating pin causes movement of said lever to actuate said stem and operate said diaphragm.

9. A diaphragm valve comprising a valve body having a flow passage, a diaphragm controlling flow through said passage, a stem projecting from the body and anchored to the diaphragm in the body, a support member on the valve body receiving the stem therethrough, said support member having an upstanding portion with a slot therein at an angle to the axis of the stem, a slotted lever pivoted on said upstanding portion at a point remote from said stem, said slots being contiguous to and overlying each other at an angle, an actuating pin passing through both of said slots aand movable along the path of the slot in said upstanding portion to cause pivotal movement of said lever, and means connecting said stem with said lever in spaced relation from said pivot whereby movement of said actuating pin will cause oscillation of said lever to move said diaphragm.

RUSSELL R. CURTIS.
EWALD J. KIMM.

References Cited in the file of this patent

UNITED STATES PATENTS

| Number | Name | Date |
|---|---|---|
| 190,066 | Nilson | Apr. 24, 1877 |
| 365,767 | Zilles | June 28, 1887 |
| 1,581,761 | Muir | Apr. 20, 1926 |
| 1,618,671 | Pick | Feb. 22, 1927 |
| 1,632,024 | Dennison | June 14, 1927 |
| 1,772,341 | DeLong | Aug. 5, 1930 |
| 1,893,059 | Mayhew | Jan. 3, 1933 |
| 1,952,648 | Andrews | Mar. 27, 1934 |
| 2,243,581 | Smith | May 27, 1941 |

FOREIGN PATENTS

| Number | Country | Date |
|---|---|---|
| 239,020 | Great Britain | 1925 |
| 328,204 | Great Britain | 1930 |
| 337,569 | Great Britain | 1930 |
| 365,112 | Italy | 1938 |
| 420,021 | Germany | 1925 |